US010229466B2

(12) United States Patent
Christensen et al.

(10) Patent No.: US 10,229,466 B2
(45) Date of Patent: Mar. 12, 2019

(54) METHOD AND SYSTEM FOR ENHANCED LOTTERY TICKET ACCOUNTING AND SALES AT A RETAIL ESTABLISHMENT LEVEL

(71) Applicant: Scientific Games International, Inc., Newark, DE (US)

(72) Inventors: Kent Christensen, Cumming, GA (US); Joseph W. Bennett, III, Suwanee, GA (US)

(73) Assignee: Scientific Games International, Inc., Newark, DE (US)

( * ) Notice: Subject to any disclaimer, the term of this patent is extended or adjusted under 35 U.S.C. 154(b) by 219 days.

(21) Appl. No.: 14/802,279

(22) Filed: Jul. 17, 2015

(65) Prior Publication Data

US 2017/0018048 A1    Jan. 19, 2017

(51) Int. Cl.
| | |
|---|---|
| *G06Q 50/34* | (2012.01) |
| *G06Q 20/20* | (2012.01) |
| *G06Q 40/00* | (2012.01) |
| *G07F 17/32* | (2006.01) |
| *G06Q 30/06* | (2012.01) |

(52) U.S. Cl.
CPC ........... *G06Q 50/34* (2013.01); *G06Q 20/202* (2013.01); *G06Q 30/06* (2013.01); *G06Q 40/12* (2013.12); *G07F 17/32* (2013.01); *G07F 17/3234* (2013.01)

(58) Field of Classification Search
USPC ........................................................ 705/21
See application file for complete search history.

(56) References Cited

U.S. PATENT DOCUMENTS

| | | |
|---|---|---|
| 2,219,650 A | 10/1940 | Helsel |
| 2,252,720 A | 10/1941 | Metzner |
| 2,325,054 A | 7/1943 | Helsel |
| (Continued) | | |

FOREIGN PATENT DOCUMENTS

| | | |
|---|---|---|
| CA | 2 566 152 A1 | 5/2003 |
| EP | 1524236 A1 | 9/2005 |
| (Continued) | | |

*Primary Examiner* — Garcia Ade
(74) *Attorney, Agent, or Firm* — Dority & Manning, P.A.

(57) ABSTRACT

A system and associated method are provided for dispensing lottery tickets at retail establishments, the lottery tickets authorized for sale in a given jurisdiction by a lottery authority. The lottery tickets are formatted for sale at the retail establishment with a ticket purchase code and a separate ticket data code. For each ticket sale, the ticket purchase code is input into a point-of-sale (POS) system of the retail establishment such that purchase of the lottery ticket mimics purchase of a non-lottery product in the POS system. For each ticket sold, a ticket data packet is transmitted from the retail establishment to a host lottery system, the data packet identifying the particular lottery ticket sold from the ticket data code and the particular retail establishment at which the lottery ticket was sold. At the host lottery system, a data base is maintained of individual ticket sales at the retail establishment and data reports are generated that include number of tickets sold at the retail establishment during specified time periods. The data reports are transmitted to the lottery authority at specified time intervals.

11 Claims, 5 Drawing Sheets

(56) References Cited

U.S. PATENT DOCUMENTS

| | | | |
|---|---|---|---|
| 2,776,007 A | 1/1957 | Dietz et al. |
| 2,970,784 A | 2/1961 | Kessler |
| 3,481,520 A | 12/1969 | Pickering |
| 3,794,228 A | 2/1974 | Colwell et al. |
| 3,894,669 A | 7/1975 | Wescoat |
| 4,094,451 A | 6/1978 | Wescoat |
| 4,202,468 A | 5/1980 | Anderson |
| 4,284,221 A | 8/1981 | Nagel et al. |
| 4,397,410 A | 8/1983 | Schueler |
| 4,515,321 A | 5/1985 | Kahlman |
| 4,586,639 A | 5/1986 | Ruff et al. |
| 4,688,708 A | 8/1987 | Irvine et al. |
| 4,697,726 A | 10/1987 | Gaucher |
| 4,716,799 A | 1/1988 | Hartmann |
| 4,730,762 A | 3/1988 | Felix |
| 4,844,369 A | 7/1989 | Kanayachi |
| 4,982,337 A | 1/1991 | Burr et al. |
| 5,074,566 A | 12/1991 | Desbiens |
| 5,113,758 A | 5/1992 | Chou |
| 5,133,615 A | 7/1992 | Salto et al. |
| 5,158,293 A | 10/1992 | Mullins |
| 5,160,076 A | 11/1992 | Ford |
| 1,905,659 A | 4/1993 | Thomson |
| 5,215,383 A | 6/1993 | Hilton |
| 5,216,595 A * | 6/1993 | Protheroe ............ G07C 15/005 |
| | | | 463/17 |
| 5,222,624 A | 6/1993 | Burr |
| 5,239,165 A | 8/1993 | Novak |
| 5,256,863 A | 10/1993 | Ferguson et al. |
| 5,408,417 A | 4/1995 | Wilder |
| 5,503,318 A | 4/1996 | Chou |
| 5,569,082 A | 10/1996 | Kaye |
| 5,709,603 A | 1/1998 | Kaye |
| 5,833,104 A | 11/1998 | Horniak et al. |
| 5,836,498 A | 11/1998 | Turek |
| 5,882,260 A | 3/1999 | Marks et al. |
| 5,927,583 A | 7/1999 | Kyle |
| 6,029,851 A | 2/2000 | Jenkins |
| 6,056,289 A | 5/2000 | Clapper, Jr. |
| 6,168,521 B1 | 1/2001 | Luciano et al. |
| 6,267,670 B1 * | 7/2001 | Walker ................ G06Q 10/087 |
| | | | 273/269 |
| 6,351,688 B1 | 2/2002 | Nichols |
| 6,405,924 B1 | 6/2002 | Shah |
| 6,582,304 B2 | 6/2003 | Walker et al. |
| 6,824,464 B2 | 11/2004 | Weil et al. |
| 6,887,153 B2 | 5/2005 | Walker et al. |
| 6,899,621 B2 | 5/2005 | Behm et al. |
| 6,899,622 B2 | 5/2005 | Lind et al. |
| 7,263,411 B2 | 8/2007 | Shows |
| 7,383,099 B2 | 6/2008 | Pollard |
| 7,740,243 B1 | 6/2010 | Kean |
| 7,756,742 B2 | 7/2010 | Gilmore et al. |
| 8,290,816 B2 * | 10/2012 | Whiteman ............ G06Q 30/06 |
| | | | 235/379 |
| 8,293,816 B2 * | 10/2012 | Yamamoto ................ C01F 7/02 |
| | | | 423/629 |
| 8,554,365 B2 | 10/2013 | Thomas |
| 9,339,121 B2 | 5/2016 | Siciliano et al. |
| 2001/0036855 A1 | 11/2001 | Defrees-Parrott et al. |
| 2002/0162850 A1 | 11/2002 | Yuyama |
| 2003/0114211 A1 | 6/2003 | White |
| 2003/0120381 A1 | 6/2003 | Perin, Jr. |
| 2003/0153381 A1 | 8/2003 | Slattery |
| 2003/0204288 A1 | 10/2003 | Scrymgeour |
| 2003/0216164 A1 | 11/2003 | Scrymgeour |
| 2004/0176154 A1 | 9/2004 | Finnochio |
| 2004/0193464 A1 | 9/2004 | Szrek et al. |
| 2004/0227000 A1 | 11/2004 | Behm et al. |
| 2004/0242309 A1 | 12/2004 | Melesko et al. |
| 2005/0014552 A1 | 1/2005 | Packes et al. |
| 2005/0023346 A1 | 2/2005 | Bakker et al. |
| 2005/0059463 A1 | 3/2005 | Gilmore et al. |
| 2005/0190533 A1 | 9/2005 | Hultzman et al. |
| 2005/0250572 A1 | 11/2005 | Kane et al. |
| 2005/0280210 A1 | 12/2005 | Harrison |
| 2006/0012116 A1 | 1/2006 | Lovell, Sr. |
| 2006/0246992 A1 | 11/2006 | Walker et al. |
| 2006/0273156 A1 | 12/2006 | Berm et al. |
| 2008/0208696 A1 | 8/2008 | Olson |
| 2011/0087369 A1 | 4/2011 | Bauer |
| 2016/0203669 A1* | 7/2016 | Arnone ................ G07F 17/329 |
| | | | 463/17 |

FOREIGN PATENT DOCUMENTS

| | | |
|---|---|---|
| WO | WO 99/26204 A1 | 5/1999 |
| WO | WO 2006/074156 A2 | 7/2006 |

\* cited by examiner

METHOD AND SYSTEM FOR ENHANCED LOTTERY TICKET ACCOUNTING AND SALES AT A RETAIL ESTABLISHMENT LEVEL

BACKGROUND

Instant lottery tickets are sold at many types of retail locations including, stores, such as grocery stores, general merchandise stores, and the like. Many such stores feature one or more check-out points or lanes equipped with a point-of-sale (POS) register. The lottery tickets, however, are typically sold at a separate lottery point-of-sale terminal within the same retail establishment. This system generally requires additional personnel to staff the lottery ticket POS terminal, or requires the store clerk to divide their time and responsibility between the lottery POS terminal and the store POS terminal. The conventional system and method also require a separate accountability and tracking system for lottery ticket sales, which can add significantly to the cost and burden of providing the lottery to players at the retail establishment.

In addition, because of the current methods by which the tickets are packaged and accounted for, an entire pack (also referred to as a "brick" or "book") of tickets is generally activated upon delivery to the retail establishment. This may result in a billing event to the retailer wherein payment becomes due on the entire pack before any significant number of the tickets have actually been sold, which can be a financial burden on the retailer.

Another problematic situation arises with certain current accountability systems and methods wherein the number of lottery tickets sold during a work shift or other defined time period must be accounted for and reconciled with payments received at the POS register or lottery terminal. Often, this is done by hand by store clerks who record start and end serial numbers of the tickets sold during their shift, which can be prone to human error, particularly in a busy or hectic environment. Systems have been proposed that automatically record the serial numbers and calculate the number of tickets sold, but even these systems do not conduct a balance reconciliation with the POS register.

The present invention relates to a unique system and method that addresses at least certain of the issues identified above, and may provide additional benefits over the conventional methodology and systems.

SUMMARY

Objects and advantages of the invention will be set forth in part in the following description, or may be obvious from the description, or may be learned through practice of the invention.

In accordance with aspects of the invention, a method is provided for dispensing instant or other preprinted lottery tickets at a retail establishment, wherein the lottery tickets are authorized for sale in a given jurisdiction by a lottery authority. The type of retail establishment may vary widely within the scope and spirit of the invention. For example, in certain embodiments, the retail establishments may be convenience stores, gas stations, pubs, and any other establishment that typically sells lottery tickets to the public. The present methodology and related system have particular usefulness for much larger retail establishments, such as "big-box" retail stores that are part of a national or other geographic chain, wherein the sale of lottery ticket sales has generally not been implemented.

A "lottery jurisdiction" is understood to be a geographic area, such as a state, territory, or the like, governed by a governmental authority. A typical example of a lottery jurisdiction is an individual state-sponsored lottery, such as the Georgia (USA) or Connecticut (USA) state lotteries. A lottery jurisdiction may also encompass multiple states or territories that participate in a national-scale lottery game, such as the PowerBall™ and Mega Millions™ games in the United States.

A "lottery authority" is understood to be the governmental body, agency, or other organization that governs play of lottery games in a particular jurisdiction. For example, the Connecticut Lottery Corporation is the lottery authority for play of lottery games in Connecticut. A lottery authority may also be an organization that governs play of multi-state games (games across multiple jurisdictions). An example of such an organization is MUSL (Multi-State Lottery Association) in the United States that administers the PowerBall™ and Mega Millions™ games for its member states.

A "host lottery system" is understood to be the system and associated entity that implements the logistical aspects of the lottery game for the lottery authority, such as printing and supplying tickets, providing server and computer services required to manage the various games, providing redemption services, and so forth. The host lottery system may be a system of the lottery authority, or may be implemented by a third party provider. An example of a host lottery system and associated entity is the system and services provided by Scientific Games International, Inc., of Alpharetta, Ga., USA.

In certain embodiments, the present method includes formatting the lottery tickets for sale at the retail establishment with a ticket purchase code and a separate ticket data code. These codes may be in the format of a machine readable bar code. The ticket purchase code mimics a UPC (Universal Product Code) or other type of code format used by the retail establishment for purchase of non-lottery products, and conveys sufficient information for processing the sale of the lottery ticket via the retail establishment's POS (Point-of-Sale) system. Thus, for each sale of a lottery ticket at the retail establishment, the ticket purchase code is input into the POS system of the retail establishment (e.g., by scanning the code) such that purchase of the lottery ticket mimics purchase of a non-lottery product in the POS system. In the POS system, the purchase code is linked to a database file wherein information necessary (e.g., price, discounts, etc.) for the purchase transaction is retrieved and processed. As with any product sold in the retail establishment, this database can be continuously updated with new lottery products, pricing, promotions, and the like.

For each lottery ticket sold at the retail establishment, a ticket data packet is transmitted from the retail establishment to a host lottery system, the ticket data packet identifying the particular lottery ticket sold from the ticket data code and the particular retail establishment at which the lottery ticket was sold. At the host lottery system, a data base of individual ticket sales at the various retail establishments is maintained, and data reports are generated that may include information such as the number of tickets sold at the retail establishment during specified time periods, the amount charged for such tickets, the exact time and date each ticket was sold, sales accountability and reconciliation reports, and other sales reports. The data reports are then transmitted at specified time intervals to the lottery authority.

In one embodiment of the method, the ticket purchase code is scanned at the time of purchase of the lottery ticket at the retail establishment with a scanner that is operably configured with a lottery ticket terminal for scanning only lottery products offered at the retail establishment. The lottery ticket terminal transmits the ticket purchase code (which includes a code derived from the ticket purchase cod) to the POS system so that payment for the lottery ticket is processed through a POS register along with non-lottery products. With this embodiment, the lottery ticket terminal generates and transmits the ticket data packet to the host lottery system via any suitable communications network.

In an alternate embodiment, the ticket purchase code and ticket data codes are scanned at the time of purchase of the lottery ticket with a scanner operably configured with a POS register at the retail establishment where non-lottery products are also scanned and purchased. The POS register differentiates ticket data codes from ticket purchase codes and transmits the ticket data codes to a lottery ticket terminal within the retail location, which may be common to a plurality of POS registers. In this embodiment, the ticket data codes simply "pass through" the POS system for subsequent use by the lottery ticket terminal. Payment for the lottery ticket is then processed through the POS register and system along with non-lottery products based on the ticket purchase code, and the lottery ticket terminal generates and transmits the ticket data packet to the host lottery system. The host lottery system then transmits the data reports to the lottery authority. In turn, the host lottery system may generate any manner of sales event data from the data reports, and transmit the sales event data to a retail back office server associated with the retail establishment based on the lottery tickets and retail establishment identified in the ticket data packs. This sales event data may include accountability and billing information for the number of lottery tickets sold at the retail establishment during the specified time periods.

For embodiments wherein the retail establishments are part of a chain and are operated under the direction of a central office or organization, the host lottery system or the lottery authority may be in communication with a central retail server that is common to such establishments. The lottery authority (or the host lottery system on behalf of the lottery authority) transmits the sales event data to a central retail server associated with the plurality of the retail establishments. The sales event data including accountability and billing information for the number of lottery tickets sold at each of the retail establishments during the specified time periods.

The present method provides the benefit of being able to activate individual tickets in the lottery system essentially as they are sold (e.g., upon receipt of the individual ticket data packet by the host lottery system). Accountability and billing information may be provided to the individual retail establishment or the central retail server from the host lottery system or lottery authority based on lottery tickets sold and/or activated during defined time periods, instead of being based on tickets delivered to the retail establishment or in inventory at another location. Accountability and billing information may also be transmitted from the host lottery system or lottery authority to a back office server for each retail establishment based on lottery tickets sold and/or activated during defined time periods. Alternately, a plurality of retail locations may be in communication with the central retail server and the host lottery system, wherein the method further includes providing accountability and billing information to the central retail server from the host lottery system or lottery authority for each of the retail locations based on lottery tickets sold and/or activated at the respective retail locations during defined time periods.

The present invention also encompasses various system embodiments incorporating the structure and operational principles set forth above and discussed in greater detail below.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
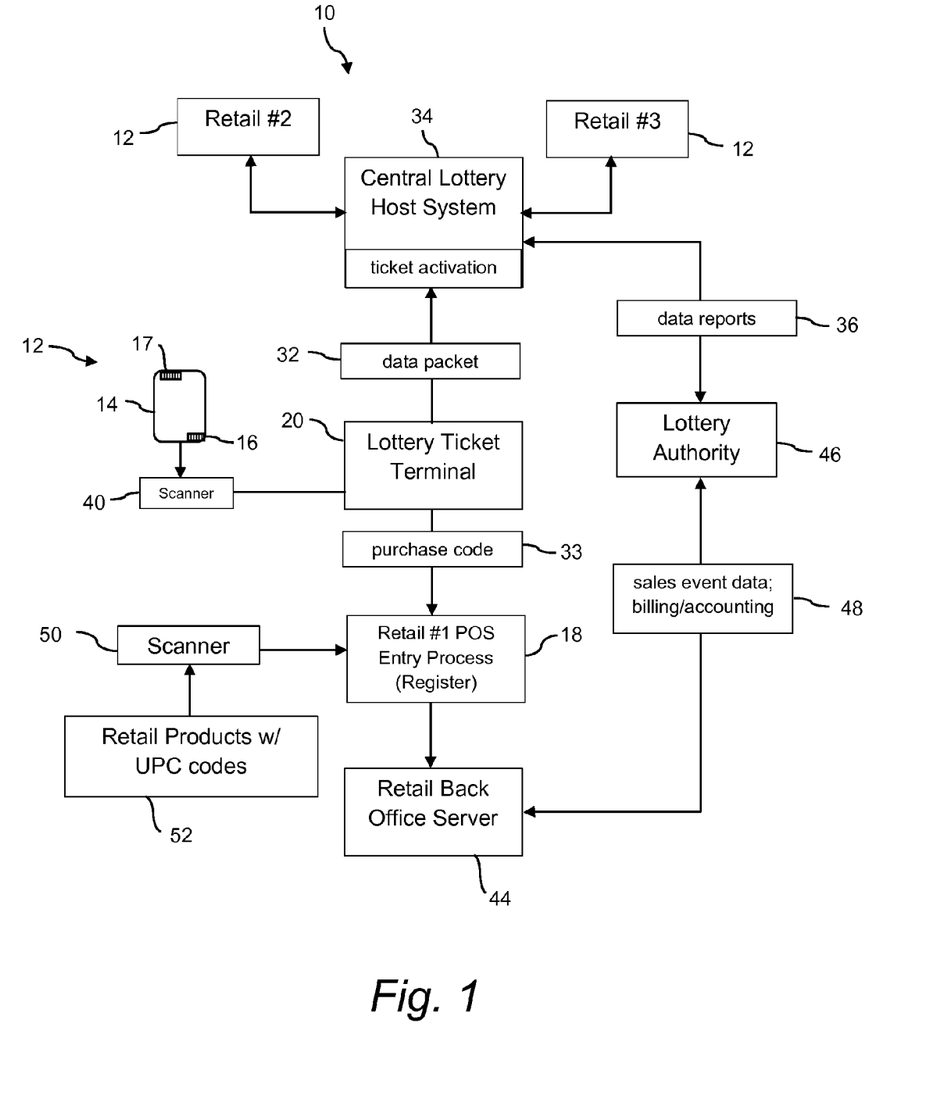
FIG. 1 is a block diagram of a system and associated methodology in accordance with aspects of the present invention.

FIG. 1 depicts an embodiment of a system 10 and related methodology for dispensing lottery tickets 14 at a retail establishment 12 authorized for sale within a lottery jurisdiction by a lottery authority 46. As mentioned above, the type of retail establishment 12 may vary widely within the scope and spirit of the invention. A retail establishment or location 12, such as a retail store, convenience store, pub, restaurant, or the like, is generally authorized by the lottery authority 46 to carry out lottery activities within the respective jurisdiction, such as the sale of instant scratch-off tickets or terminal based tickets for draw games such as PowerBall™ issued from a lottery terminal. As discussed above, the lottery jurisdiction may be a state and the lottery authority may be a governmental agency or entity, such as the Pennsylvania Lottery. A separate game provider may be partnered with the lottery jurisdiction to provide certain control, implementation, and logistical functions of the game. In this disclosure, the game provider is referred to as the lottery host system 34. It should be appreciated that the type of retail establishment 12, lottery jurisdiction entities 46, and host systems 34 are not limiting factors of the invention.

Although not limited to such, the present system 10 has particular usefulness for larger retail establishments, such as "big-box" retail stores that are part of a national or other geographic chain. In FIG. 1, three separate retail establishments 12 are depicted, with details given for one the establishments. This is for illustrative purposes only. It should be appreciated that the invention encompasses a single retail establishment 12, as well as a multitude of establishments 12, as discussed in greater detail below.

The retail establishment 12 includes one or more retail point-of-sale (POS) registers 18 wherein patrons of the establishment 12 purchase goods 52. This register 18 may be considered as an entry point for lottery tickets 14 into the retail establishment's POS system. Typically, a scanner 50 is associated with the POS register 18 to scan a UPC code on the products 52, with the UPC code linked to a purchase price and identification of the products 52 in a data file, as is well-known in the art.

In the embodiment of FIG. 1, a lottery ticket terminal 20 is configured in wired or wireless communication with the retail POS register 18 to accept a request for purchase of a particular lottery ticket 14, which may be selected from a plurality of different lottery tickets made available to patrons of the establishment 12 for purchase. This purchase request may be input directly to the terminal 20 or come via the POS register 18, as discussed below. The lottery tickets 14 may be, for example, conventional instant scratch-off lottery tickets.

Various types of lottery ticket terminals are known in the art and are suitable for configuration with a system and associated method 10 in accordance with the invention. For example, Scientific Games Corporation having a principal place of business in Alpharetta, Ga., USA, offers Flair™ and Wave™ lottery ticket terminals that may be readily configured by those skilled in the art for a system as described herein. A patron's request for a particular scratch-off lottery ticket may be inputted into the lottery ticket terminal 20 by a retail clerk or other employee of the retail establishment 12 by various means. In a particular embodiment, the lottery tickets 14 are formatted for sale at the retail establishment 12 with a ticket purchase code 16 and a separate ticket data code 17. These codes may be in the format of a machine readable bar code. The ticket purchase code 16 mimics a UPC or other type of code format used by the retail establishment POS system for purchase of non-lottery products, and conveys sufficient information for processing the sale of the lottery ticket 14 via the retail establishment's POS system. Thus, upon selection of a particular ticket 14, the clerk may scan the ticket purchase code 16 printed on the ticket with the scanner 40. The terminal 20 in communication with the scanner 40 then passes the ticket purchase code 17 (or a purchase code 33 derived from the ticket purchase code 16) to the POS register 18 or other POS entry functionality, wherein the ticket is then paid for by the patron as any other goods 52 purchased at the establishment 12. Thus, purchase of the lottery ticket 14 mimics purchase of a non-lottery product in the POS system. In the POS system, the purchase code 16, 33 is linked to a database file wherein information necessary (e.g., price, discounts, etc.) for the purchase transaction is retrieved and processed. As with any product sold in the retail establishment 12, this database can be continuously updated with new lottery products, pricing, promotions, and the like.

Each of the tickets 14 includes a unique ticket data code 17 containing identifying information unique to the ticket, much akin to a serial number assigned to each ticket 14. For each lottery ticket 14 sold at the retail establishment 12, a ticket data packet 32 is transmitted from the retail establishment to the host lottery system 34, the ticket data packet 32 identifying the particular lottery ticket sold from the ticket data code 17 and the particular retail establishment 12 at which the lottery ticket 14 was sold. This data packet 32 may be generated by the lottery ticket terminal 20 from information derived from the ticket data code 17, or the terminal 20 may simply pass through the ticket data code 17 along with additional data that identifies the retail establishment 12, time and date of ticket sale, and so forth.

At the host lottery system 34, a data base of individual ticket sales at the various retail establishments 12 is maintained, and data reports 36 are generated that may include information such as the number of tickets 14 sold at the retail establishment 12 during specified time periods, the amount charged for such tickets, the exact time and date each ticket 14 was sold, accountability and other sales reports, and so forth. The data reports 36 are then transmitted at specified time intervals to the lottery authority 46.

Figure 3:
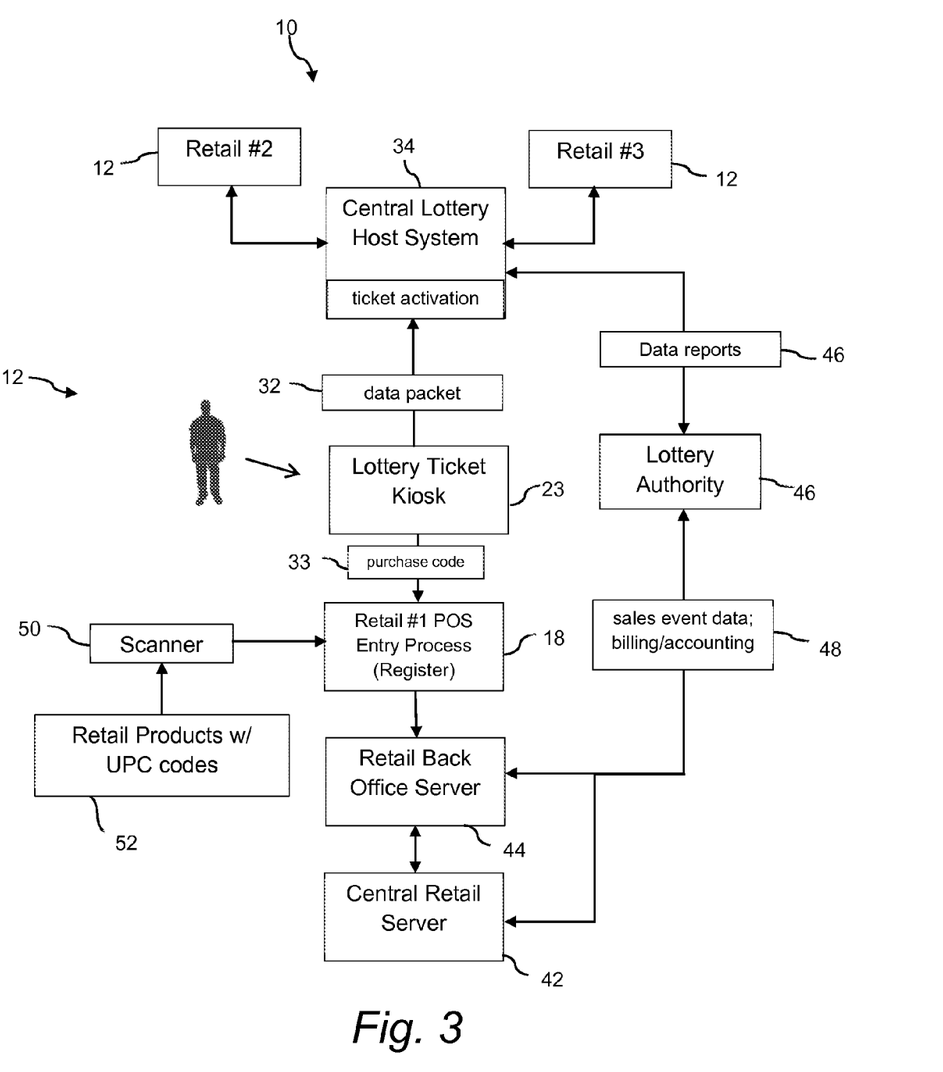
FIG. 3 is a block diagram of still another embodiment of a system and associated methodology in accordance with aspects of the present invention.

Still referring to the embodiment of FIG. 1, the lottery authority 46 may use the information contained in the data reports 36 to generate any manner of sales event data reports 48 that are transmitted to a retail back officer server 44 associated with each retail establishment 12 participating in the overall system 10. This sales event data 48 may include accountability and billing information (e.g., invoicing) for the number of lottery tickets 14 sold at the retail establishment 12 during a specified time periods. Referring to FIG. 3, for embodiments wherein the retail establishments 12 are part of a chain and are operated under the direction of a central office or organization, the lottery authority 46 may be in communication with a central retail server 42 (e.g., a "home office" server) that is common to such establishments 12. The lottery authority 46 (or the host lottery system 34 on behalf of the lottery authority 46) transmits the sales event data 48 to the central retail server 42 with accountability and billing information for the number of lottery tickets 14 sold at each of the retail establishments 12 during the specified time periods. Thus, centralized billing and accounting for all of the retail establishments 12 can be conducted between the lottery authority 46 (or the host lottery system 34 on behalf of the lottery authority 46) and the central retail server 44.

The lottery host system 34 may also provide accountability information related to the number of tickets 14 sold versus the number of tickets delivered to each respective establishment 12, including particularly identifying discrepancies between the number of tickets delivered and the number of tickets sold. At its end, the central retail server 42 can compare the number of tickets 14 reported as dispensed to the sales transactions at the respective establishment 12 (reported via a back office server 44 associated with each establishment 12 or directly from the POS registers 18) over the same time period FIG. 2 reflects a method embodiment wherein the ticket purchase code 16 and ticket data code 17 are scanned at the time of purchase of the lottery ticket 14 with a scanner 50 operably configured with the POS register 18 at the retail establishment 12 where non-lottery products 52 are also scanned and purchased. In one method, the scanner 50 differentiates between the ticket data code 17 and the ticket purchase code 16 (e.g., from a prefix attached to the data code 17) and passes the data code 17 directly to the lottery ticket terminal 20. In an alternate embodiment depicted by the dashed lines in FIG. 2, the scanner 50 passes the data code 17 along with the purchase code 16, 33 directly to the POS register 18. The register 18, in turn, differentiates the ticket data code 17 from ticket purchase code 16 and transmits the ticket data code 17 to the lottery ticket terminal 20. With either of these embodiments, the ticket data codes 17 simply "pass through" the POS system for subsequent use by the lottery ticket terminal 20. Payment for the lottery ticket is then processed through the POS register 18 and system along with non-lottery products 52 based on the ticket purchase code 16, and the lottery ticket terminal 20 generates and transmits the ticket data packet 32 to the host lottery system 34, as discussed above.

Figure 2:
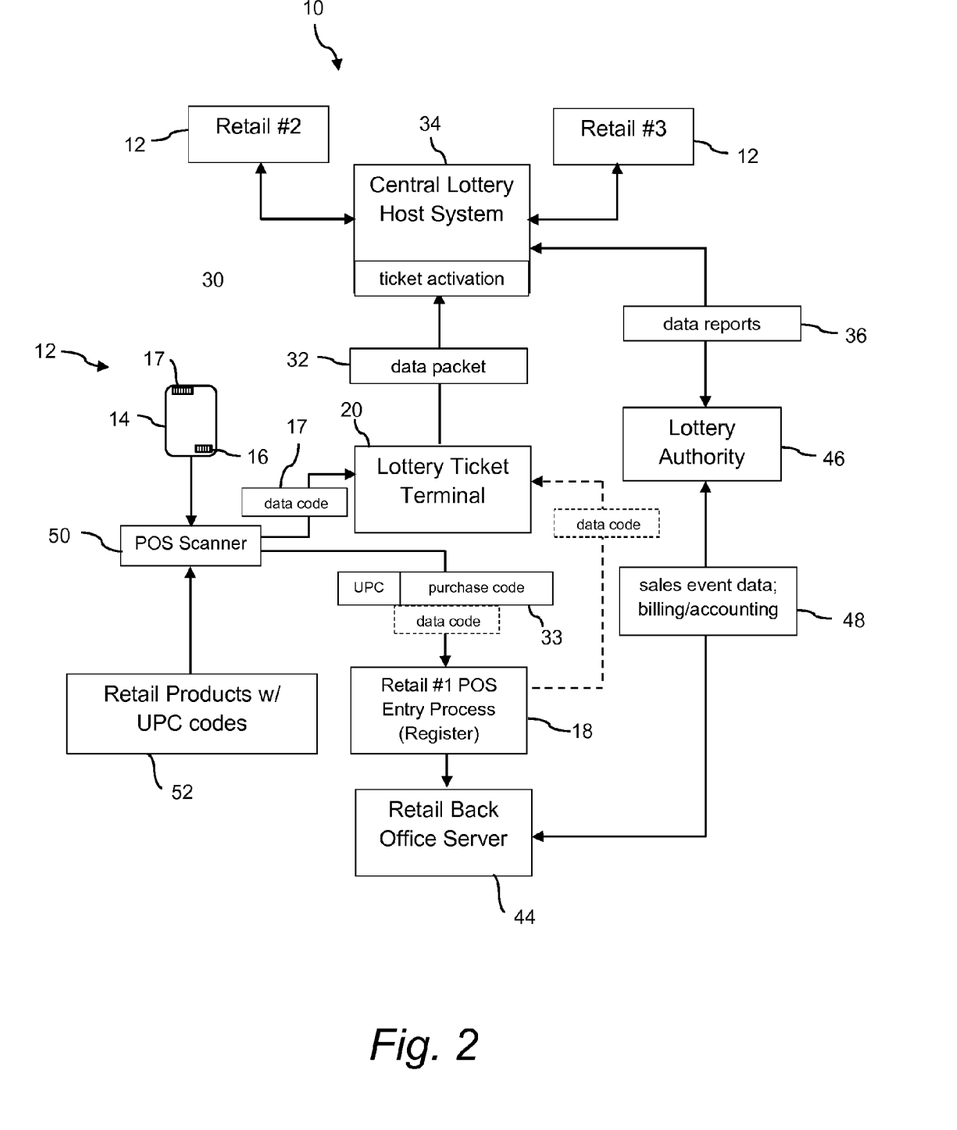
FIG. 2 is a block diagram of an alternate system and associated methodology in accordance with aspects of the present invention.

The act of scanning the ticket data code 17 and purchase code 16 on an individual ticket 14 may be variously conducted. In one embodiment, the codes are located at a position on the same side of the ticket such that a single "swipe" of the ticket across a scanner will read both codes. For example, the codes 16, 17 may be presented adjacent to each other or at opposite edges of the same surface of the ticket 14, as depicted in FIGS. 1 and 2. In an alternate embodiment, the retail clerk may be prompted by a display to conduct another scan of the product in the event that both scans 16, 17 were not read. For example, if the clerk were only to scan the purchase code 16, the POS system recognizes (e.g., via a product look-up table) the product relates to a lottery ticket and may generate an alert (audio or visual) to the clerk to separately scan the ticket data code. On the other hand, if the clerk were to only scan the ticket data code 17, the POS system would recognize that an associated purchase code 16 must also be scanned and may generate an alert to the clerk to separately scan the purchase code 16.

FIG. 3 depicts a method embodiment wherein purchase of the lottery tickets is made directly by the patrons of the retail establishment 12 at a lottery ticket kiosk 23 or other type of self-serve station. Once a ticket 14 is selected for purchase at the kiosk 23, the purchase code 16, 33 is transmitted to POS register 18 (or other POS entry location), as discussed above. Likewise, the ticket data packet 32 (which may simply be the ticket data code 17 with appended additional information related to time/date of sale) is transmitted by the kiosk 23 to the host lottery system 34.

Figure 4:
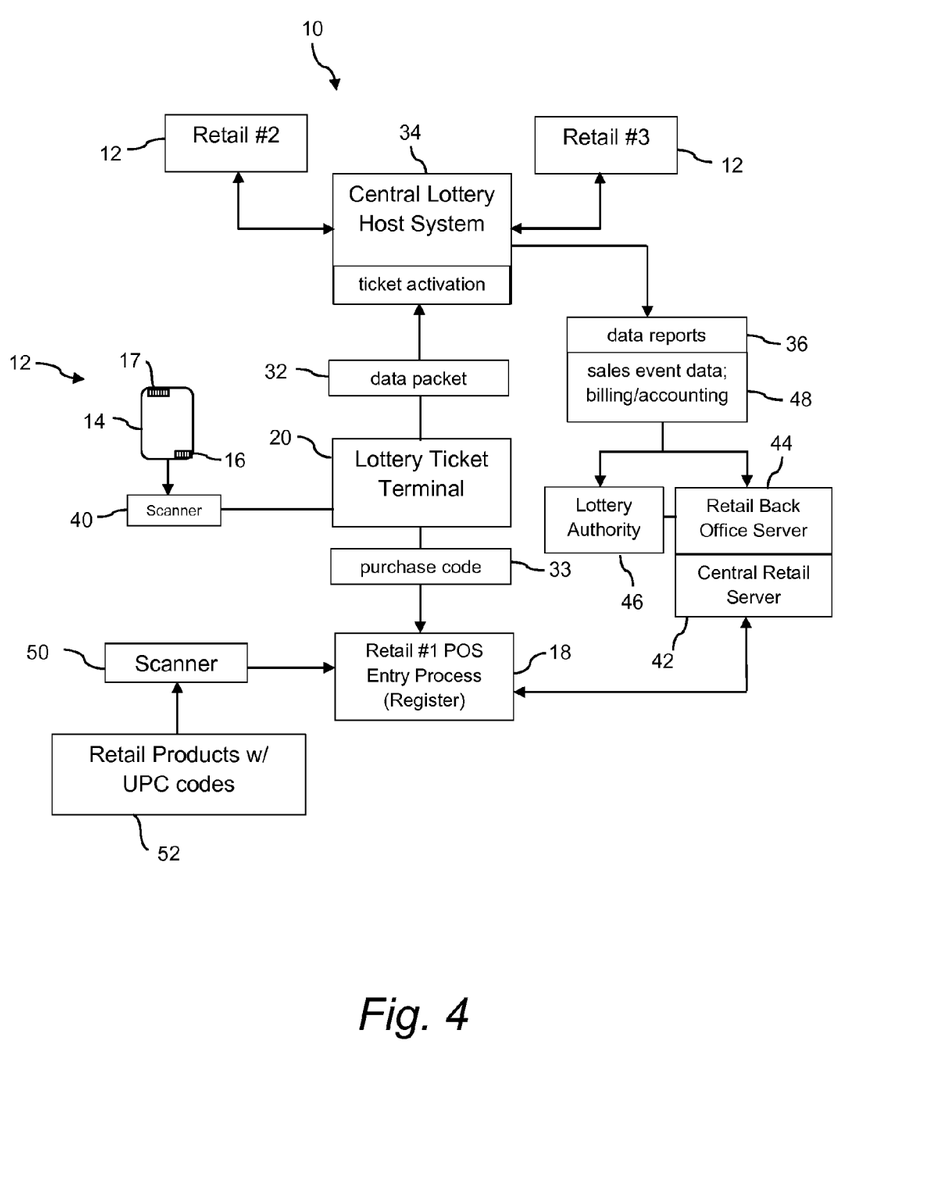
FIG. 4 is a block diagram of yet another system and associated methodology in accordance with aspects of the present invention.

FIG. 4 depicts an embodiment similar to FIG. 3 wherein the retail establishments 12 are part of a chain and are operated under the direction of a central office or organization having a central retail server 42. This embodiment depicts that responsibility for generating and transmitting the sales event data 48 to the central retail server 42 and/or the various back office servers 44 lies with the central host system 34 on behalf of the lottery authority 46.

In the figures, the process of "ticket activation" is depicted at the central lottery host system 34. As discussed above, the present method provides the benefit of being able to activate individual tickets 14 in the lottery system essentially as they are sold (e.g., upon receipt of the individual ticket data packets 32 by the host lottery system 34). Accountability and billing information may be provided to the individual retail establishment 12 or the central retail server 42 from the host lottery system 34 or lottery authority 46 based on lottery tickets 14 actually sold and/or activated during defined time periods, instead of being based on tickets delivered to the retail establishment or in inventory at another location. Accountability and billing information 48 may also be transmitted from the host lottery system 34 or lottery authority 46 to a back office server 44 for each retail establishment based on lottery tickets actually activated during defined time periods. The number of tickets 14 sold during a work shift (or other time period) is easily determined by generating a report by the host system 34 of the tickets sold at any of the retail establishments during any defined time period. Thu number of tickets 14 sold at any of the retail establishments 12 can be readily rectified with tickets delivered to the establishment. Likewise, the number of tickets 14 dispensed during a defined time can be readily and electronically rectified with reported purchase transactions from the respective establishment 12, with discrepancies being immediately identified for further investigation.

Another particular advantage of the system 10 and associated method is that billing practices between the retail establishments 12 and the lottery service provider or ticket manufacturer can be based on real-time sales of the lottery tickets 14. For example, the retail establishments 12 can be invoiced on a periodic basis (e.g., daily or weekly) for the actual number of tickets sold at each respective establishment based on the data packets 32 routed to the lottery host system 34 instead of upon delivery for an entire inventory of lottery tickets 14 even before any such tickets are sold.

Figure 5:
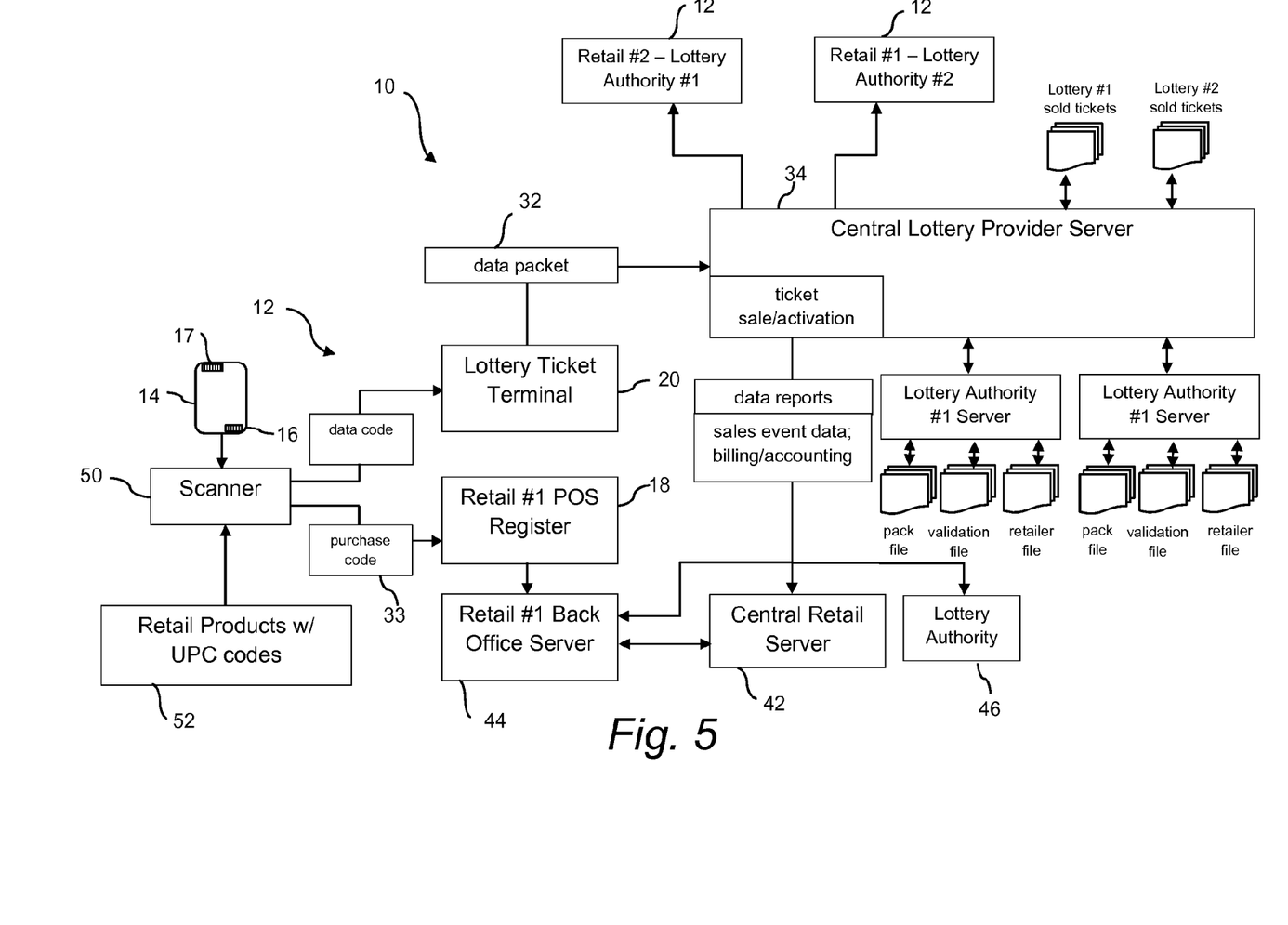
FIG. 5 is a block diagram of another embodiment of a system and associated methodology in accordance with aspects of the present invention.

FIG. 5 depicts a system 10 having many of the components and functionalities discussed above with respect to FIGS. 2 through 4. In FIG. 5, the central lottery host system 34 interfaces with more than one Lottery Authority. Each respective Lottery Authority server typically contain three files related to the distribution, validation and billing for instant lottery games, packs, and tickets. These include the pack file, validation file and retailer file. The pack file is a listing of every pack that can be offered for sale in an instant game along with the activation status of that pack. Typically, such files do not associate an activation status with each individual ticket in a pack, but only a single status based on its unique game-pack number. The validation file is a listing of every winning ticket in a game based on its unique non-locational validation number. Finally, the retailer file contains information on each retail location offering instant tickets for sale in the Lottery Authority's jurisdiction.

The central system 34 is shown to maintain files of sold tickets for each jurisdiction. These files are organized to maintain sold ticket data for each retail location 12 in each jurisdiction. Accordingly, the central system 34 can provide cross-jurisdictional sales reporting to a "Big Box" chain with retail locations in more than one Lottery Authority. Such reporting is very beneficial to such chains and presently cannot be provided in a seamless fashion by individual Lottery Authorities.

Such a system organization permits the implementation of the system 10, in a Lottery Authority whose server was never architected to support recording the sale of individual instant game tickets, with minimal changes to the Lottery Authority server. With the present system 10, all detailed instant ticket sale transaction data is maintained on the central lottery system 34, which may never have been envisioned in the original architecture of extant Lottery Authority servers.

FIG. 1 depicts the central lottery host system 34 as common to the retail establishments 12. The term "system" is used herein to encompass any configuration of computer hardware and software that is maintained by a lottery authority 46 or third-party game provider to carry out the functionalities of the present system 10 and associated method, as well as any manner of additional lottery functions known to those skilled in the art. It should be readily appreciated that the system 34 may include an integrated server, or any manner of periphery server or other hardware structure. The central lottery host system 34 is typically remote from the retail establishments 12, and is in communication with the establishments 12 via a suitable secure communication network, which may include any manner of wide area network, wireless internet, or cloud computing. The system 34 may be a single networked computer, or a series of interconnected computers having access to the communications network via a gateway or other known networking system. Generally, the system 34 is configured to communicate with, manage, execute and control individual lottery terminal units 20 within the lottery jurisdiction. The system 34 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The system 34 may be directly or indirectly connected through an I/O bus to any manner of peripheral devices such as storage devices, wireless adaptors, printers, and the like. In addition, a database (DB) may be communicatively connected to the system 34 and provide a data repository for the storage and correlation of information gathered from the individual data packets 32, such as the identity of each lottery ticket 14 sold, the date/time of sale, the status of the ticket 14 (a winning or losing ticket), confirmation of ticket activation, and so forth.

It should be appreciated that embodiments of the methods and systems 10 disclosed herein may be executed by one or more suitable networked lottery gaming components and establishment components (e.g., POS register 18, back office server 44) within a plurality of the establishments 12, as well as the remote central host system 34. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present systems 10 and methods rely on the transmission of data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, an intranet or other type(s) of networks. A network may comprise any number and/or combination of hard-wired, wireless, or other communication links.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for dispensing pre-printed scratch-off lottery tickets at a retail establishment, the lottery tickets authorized for sale in a given jurisdiction by a lottery authority, the method comprising:

printing each lottery ticket with a ticket purchase code and a separate ticket data code prior to providing the lottery tickets to the retail establishment;

at time of purchase of one of the lottery tickets at the retail establishment, electronically scanning the ticket purchase code with a scanner into a point-of-sale (POS) system of the retail establishment such that purchase of the lottery ticket mimics purchase of a non-lottery product in the POS system;

at the time of purchase, electronically scanning and using the ticket data code to electronically retrieve or generate a ticket data packet associated with the ticket data code;

for each lottery ticket sold at the retail establishment, electronically transmitting the ticket data packet from the retail establishment to the host lottery system, the ticket data packet identifying the particular lottery ticket sold from the ticket data code and the particular retail establishment at which the lottery ticket was sold;

at the host lottery system, maintaining a data base of individual ticket sales at the retail establishment and electronically generating data reports that include at least the number of lottery tickets sold at the retail establishment during one or more specified time periods; and transmitting the data reports at specified time intervals to the lottery authority, the data reports comprising accountability and billing information based on the number of lottery tickets sold rather than a number of lottery tickets delivered to the retail establishment.

2. The method as in claim 1, wherein the ticket purchase code is scanned at the time of purchase of the lottery ticket with a scanner associated with a lottery ticket terminal, the lottery ticket terminal transmitting the ticket purchase code to the POS system so that payment for the lottery ticket is processed through a POS register along with non-lottery products.

3. The method as in claim 2, wherein the lottery ticket terminal generates and transmits the ticket data packet to the host lottery system.

4. The method as in claim 1, wherein the ticket purchase code and ticket data codes are scanned at the time of purchase of the lottery ticket with a scanner associated with a POS register at the retail establishment where non-lottery products are also scanned and purchased, the POS register differentiating ticket data codes from ticket purchase codes and transmitting the ticket data codes to a lottery ticket terminal within the retail location.

5. The method as in claim 4, wherein payment for the lottery ticket is processed through the POS register along with non-lottery products based on the ticket purchase code.

6. The method as in claim 4, wherein the lottery ticket terminal generates and transmits the ticket data packet to the host lottery system.

7. The method as in claim 1, further comprising activating the sold lottery ticket at the host lottery system upon receipt of the ticket data pack.

8. The method as in claim 7, wherein the host lottery system transmits the data reports to the lottery authority.

9. The method as in claim 8, wherein the lottery authority transmits sales event data to a retail back office server associated with the retail establishment based on lottery tickets and retail establishment identified in the ticket data packs.

10. The method as in claim 8, wherein a plurality of the retail establishments are in communication with the host lottery system, the lottery authority transmitting sales event data to a central retail server associated with the plurality of the retail establishments, the sales event data including accountability and billing information for the number of lottery tickets sold at each of the retail establishments during the specified time periods.

11. The method as in claim 1, further comprising activating the lottery ticket at the host lottery system upon receipt of the ticket data packet.

* * * * *